United States Patent [19]
Smeets

[11] 3,898,411
[45] Aug. 5, 1975

[54] METHOD AND APPARATUS FOR PREHEATING AN UNCURED RUBBER TIRE

[75] Inventor: Joseph Gerard Alphons Smeets, Maastricht, Netherlands

[73] Assignee: International B. F. Goodrich-Europe B.V., The Hague, Netherlands

[22] Filed: July 5, 1972

[21] Appl. No.: 269,212

[30] Foreign Application Priority Data
July 10, 1971   Germany............................. 2134526

[52] U.S. Cl....................... 219/10.55 R; 219/10.55
[51] Int. Cl.²........................................... H05B 9/06
[58] Field of Search... 219/10.55, 10.55 R, 10.55 A, 219/10.55 M, 10.55 E; 425/41, 174.8 R

[56] References Cited
UNITED STATES PATENTS

| | | | |
|---|---|---|---|
| 3,277,580 | 10/1966 | Tooby........................... | 219/10.55 X |
| 3,566,066 | 2/1971 | Borthwick et al............... | 219/10.55 |
| 3,665,491 | 5/1972 | Cooper........................... | 219/10.55 |
| 3,745,291 | 7/1973 | Peterson et al.................. | 219/10.55 |

*Primary Examiner*—Bruce A. Reynolds
*Attorney, Agent, or Firm*—W. A. Shira, Jr.

[57]     ABSTRACT

A method and apparatus for preheating one or more selected zones of an uncured or green pneumatic tire, formed of natural or synthetic rubber, while the latter is in either a hollow cylindrical or partially or completely shaped to the conventional tire configuration. The heating is effected by ultra-high frequency energy with the heating of different zones being to differing amounts dependent upon the volume and characteristics of the materials in the zones such that, upon subsequent vulcanization at uniform temperature, all zones will be substantially equally vulcanized. The apparatus includes means to support and rotate the uncured tire within a housing into which the preheating energy is introduced.

11 Claims, 4 Drawing Figures

PATENTED AUG 5 1975
3,898,411
SHEET 3

METHOD AND APPARATUS FOR PREHEATING AN UNCURED RUBBER TIRE

BACKGROUND OF THE INVENTION

It is already a known procedure, in the manufacture of tires, to preheat green tire blanks by means of an ultra-high frequency energy, whereby the blanks are introduced in an hermetically sealed preheating chamber into which is conducted an ultra-high frequency energy parallel to the axis of the blanks, which upon entering the chamber is distributed by an impeller that reflects the energy. The blank to be preheated is clamped by its edges or its edge beads and is revolved around its axis within the chamber. In this manner, the ultra-high frequency energy affects all parts of the blanks to the same degree, so that the various thicknesses and characteristics of the material cannot be taken into account. One result of this, among others, is, for instance, that the thin sections of the blank are subjected to a higher preheating temperature than the tire section with thicker walls. This means that the thicker portions of the blanks cannot be preheated to close to the curing temperature if an excessive heating of the thin-walled portions must be avoided during the preheating operation.

A tire blank that is preheated in the formerly familiar manner must be therefore subjected to heat in the curing press for considerably longer periods, involving the danger that the portions of the blanks having thinner gauges shall be over heated. Moreover, the fact that a blank so preheated must remain in the curing press for a longer time reduces the output of the press.

The curing presses used for blanks preheated in the above manner must be built very sturdily because if the thicker portions of the blanks have not been preheated to close to the curing temperature, they offer considerable resistance to the necessary flowing in the presses.

One is also already familiar with the tire manufacturing procedure whereby at least one portion of the tread rubber in the blank has been preheated in order to reduce its viscosity and to facilitate the flow of the material in that portion or in that zone, so that when producing tires with a deep-grooved tread design, as, for instance, earth-moving tires, one avoids the corresponding distortion of the carcass plies which are normally ring-shaped. Such a preheating is therefore only local and affects only that portion of the blank, the material of which must flow the most in the curing press.

SUMMARY OF THE INVENTION

The purpose of this invention is to avoid the drawbacks of the previous method of preheating tire blanks, and provide a procedure that will preheat those blanks in such a way that they can be brought up to the curing temperature in a short time, simultaneously, in all their zones, thereby avoiding any overcuring subsequent to the preheating process, and so that the material of the blanks also presents a relatively feeble resistance to flow when in the curing press.

Furthermore, it is the object of this invention to create an apparatus that shall execute the process according to this invention, and which, due to a good utilization of the ultra-high frequency energy employed, shall be of a simple construction and easy to maintain.

The method here proposed to satisfy this objective provides for a preheating of all the zones of the tire blank, zone by zone, at varying high temperatures, depending upon the volume and the characteristics of the material in each zone. By this method, the various zones of the blank can be preheated at the temperatures that are best suited for the subsequent processing of the blank.

This invention also insures that the preheating of each individual zone be done in such a way that the subsequent vulcanization process may be carried out at one uniform curing temperature.

According to this new process, during the preheating, the gauges and the characteristics of the material in the blanks are taken into account so that the zones of the blank which require the most heat can be preheated to near the vulcanization temperature without injuring those zones which require a minimum of preheating or could be overheated in the cure. By adopting a uniform temperature within the vulcanizing press, it is possible, with a tire blank preheated in this manner, to bring the widest preheated sectors, which require the most heat, up to the curing temperature within the shortest time. During the same period, those sectors of the blank which have been preheated the least and which require the least heat, are also brought up to their vulcanizing temperature. The result is an approximately equal degree of cure in all the portions of that blank, once the vulcanizing period is concluded.

Predicated on this procedure, the time during which the blank remains in the curing press is reduced considerably because of the relatively small amount of heat required by the cure, so that the press is better exploited. Besides, the press can be built in a relatively lighter construction due to the accomplishments of this invention, because the thicker sections, especially of the blanks, are extensively preheated and therefore present only a small resistance to flow, which in turn requires only a relative small amount of pressure.

A further feature is embodied in this invention, namely that the preheating of a hollow cylindrical tire blank is done in the axial direction of the consecutive zones of the blank. Thus, an accurate subdivision of the zones, according to the volume and to the characteristics of the material in each individual zone, becomes possible.

The invention further envisages that the preheating of a partially or almost completely shaped green tire blank is done in the zones that concentrically surround the axis of the blank. This procedure is especially suited for the preheating of radial or belted tires, which are constructed with the partial or almost complete shape of a tire, and also of such bias tires which have been given the curved shape prior to the preheating. Also, in the case of such preheating, it is possible to separate in a suitable manner the zones which require varying amounts of heat.

A further aspect of this invention is that the preheating is done in all zones of the tire blank except on the beads which are fitted with wire rings. It is actually advisable in many instances to exclude the beads of the blanks from the preheating because they need only a small amount of heat, due to their steel wire insertions and to the small quantity of rubber they entail, which can be provided by the vulcanizing press in a very short time.

In order to resolve the problems which are the basis of this invention, the apparatus for the implementation of the method must be so arranged that the preheating chamber is subdivided into zones by means of partitions which are impervious to ultra-high frequency energy and into each one of which is introduced a separate transmitter to supply the varying amounts of energy applicable to each zone.

The new apparatus makes possible the preheating of the various zones of the blank in the desired manner. The energy transmitters can be connected separately and independently to the source of energy or all can be connected to one common energy source.

It is further envisaged that in the new apparatus the preheating chamber shall consist of two hinged parts, jointed, swinging along a line that runs parallel to the longitudinal axis of the chamber. This particular arrangement contributes to the easy placing of the blanks to be preheated into the chamber.

According to a further feature of this invention, the separating wall or walls which go to form the individual zones of the chamber for preheating hollow cylindrical green tire blanks, run transversely in relation to the longitudinal axis of the chamber. The separating wall or walls run, by preference, from the shell of the preheating chamber to the proximity of the outer surface of the blank that has been placed in the chamber to be preheated. In this manner, one achieves a suitable partition of the zones along with an adequate separation between the individual zones.

A further recommendation is that in this new apparatus a shaft be installed through the preheating chamber, coaxial in relation to its longitudinal axis, said shaft to be equipped with one or more intermediate discs which do not allow the ultra-high frequency energy to go through them and which are located in the plane or planes of the intermediate wall or walls. This construction represents an extension of the separation of the individual zones from each other, and insures that the ultra-high frequency energy which has passed through the green tire blanks shall not, uncontrolled, affect other zones of the blanks.

Finally, the invention provides that, in this new apparatus, the intermediate wall or walls which constitutes or constitute the zones of the preheating chamber for the preheating of green blanks of partially or almost completely shaped tires shall surround, concentrically, the longitudinal axis of the preheating chamber. Said intermediate wall or walls shall emanate, by preference, from the end walls of the preheating chamber and terminate immediately below or above the outer surface of the green tire blank that lies in the preheating chamber. Also, in this manner one insures an adequate division of the zones by a sufficient separation of the various zones from each other.

In the following portion of the description are explained two ways of carrying out the objectives of this invention, with the aid of the accompanying drawings.

DETAILED DESCRIPTION

Figure 1:
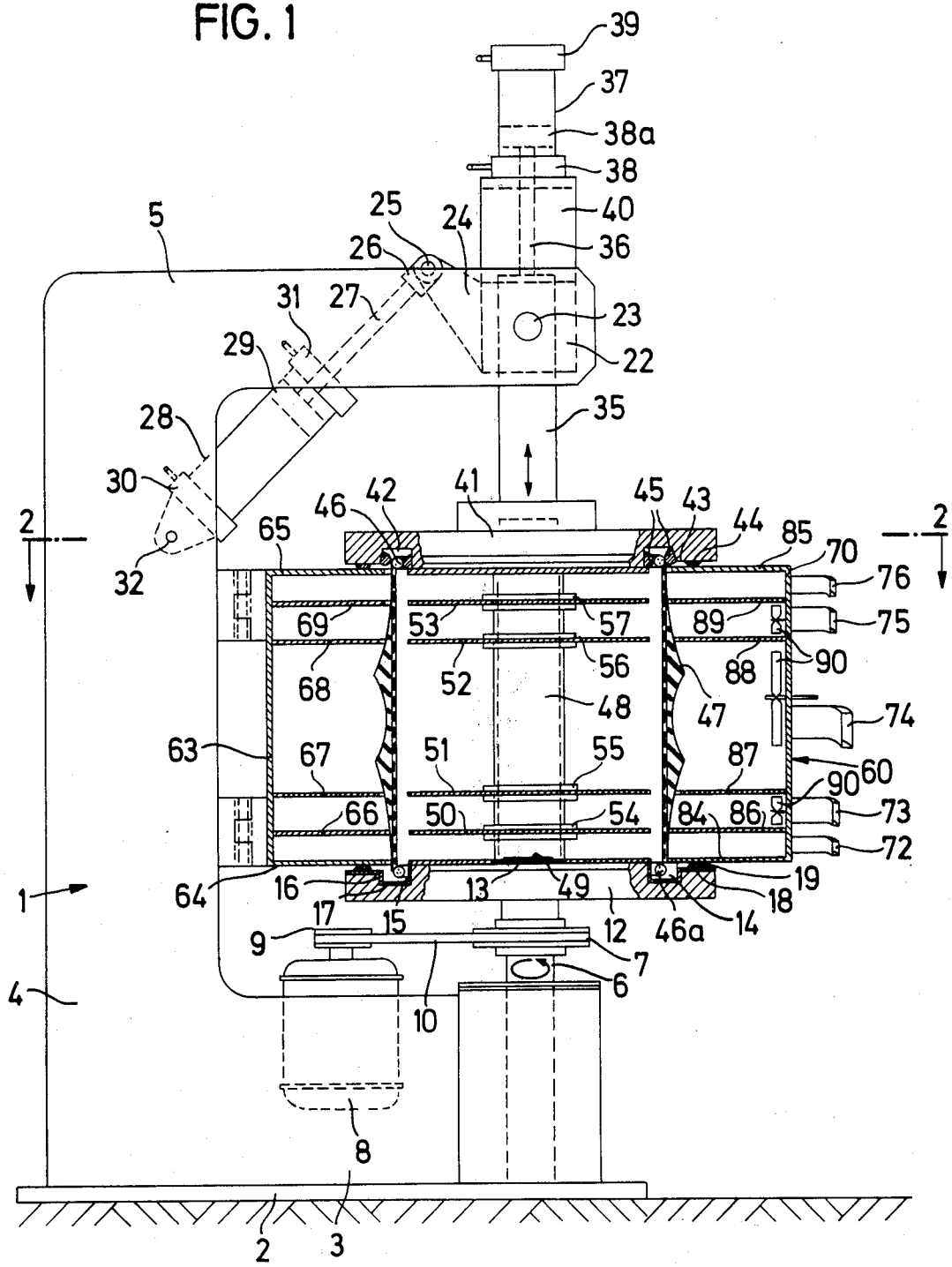
FIG. 1 is a sectional view along line 1—1 of FIG. 2 illustrating one form of execution of the new apparatus to preheat diagonal tires in the form of hollow cylinders.
Figure 2:
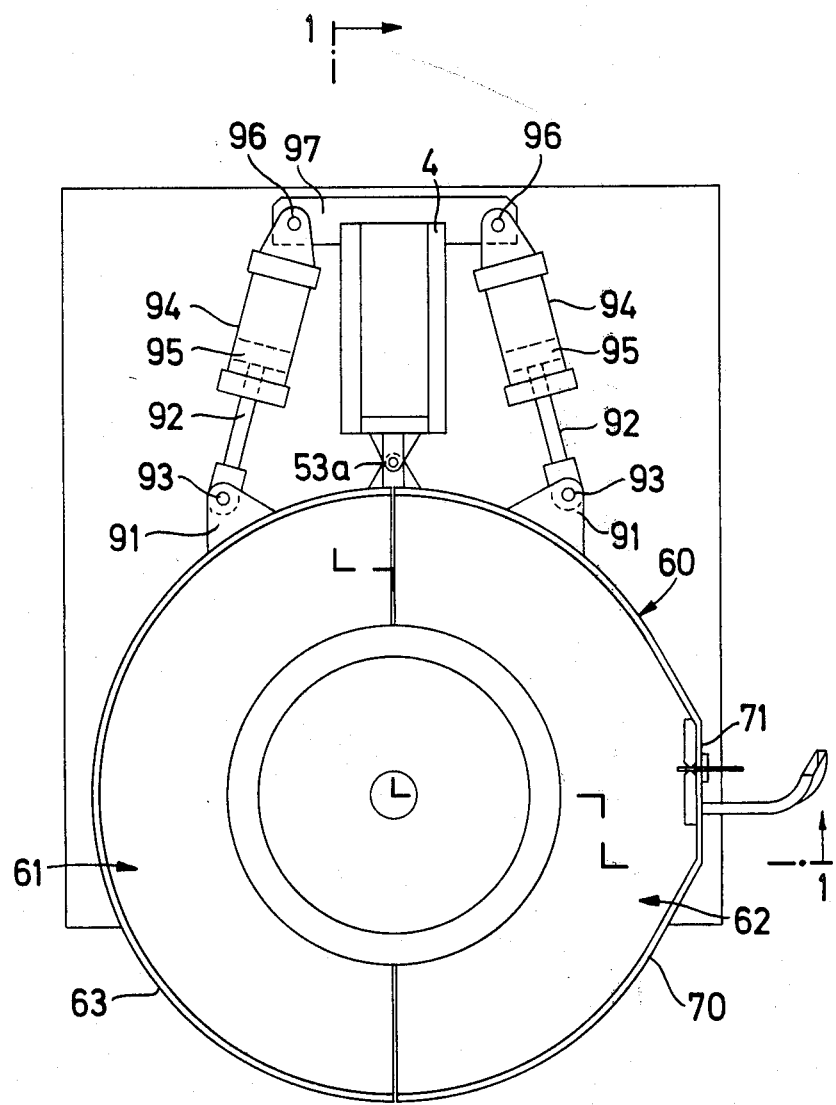
FIG. 2 is a sectional view along line 2—2 of FIG. 1.
Figure 4:
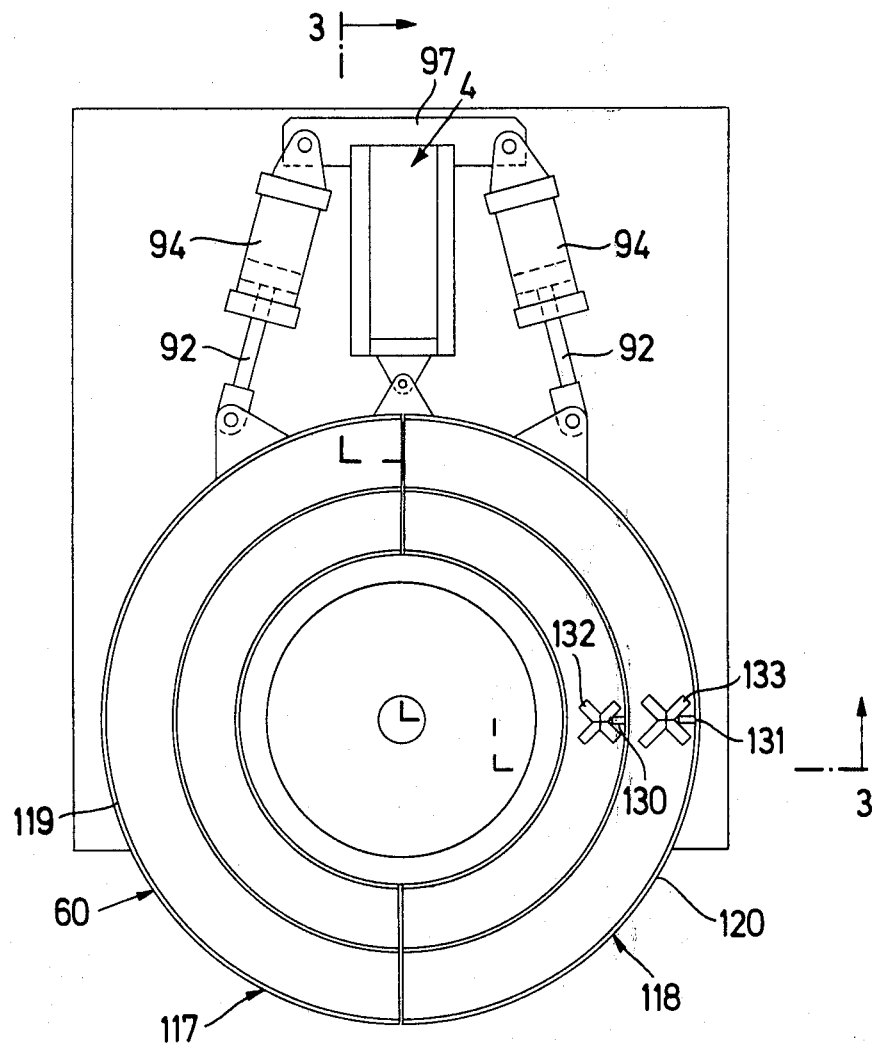
FIG. 4 is a sectional view along line 4—4 of FIG. 3.

The new apparatus shown in FIGS. 1 and 2 involves a C-shaped frame 1 which is placed on a foundation plate 2. Stand 1 features a horizontal bottom beam 3 to the left end of which, as shown in FIG. 4, is connected a vertical column-shaped component 4, the upper end of which supports an upper beam 5, which runs parallel to the bottom beam 3.

The free end of the lower beam 3 accommodates a vertical rotating shaft 6 which is fitted, in spaced relationship, above the bottom beam 3 with a V-belt sheave 7. Also, on the bottom beam 3 rests an electric motor 8, the rotational axis of which runs parallel with shaft 6. The electric motor 8 supports at its top a V-belt sheave 9, which, by means of a V-belt 10, turns sheave 7 on shaft 6.

Shaft 6 carries on its upper end a plate 12, which, on its tops side, features a circular surface in the center of which is fitted circular friction disc 13. The circular surface is also coated with an ultra-high frequency radiation reflecting or a radiation impervious material, such as, for instance, brass. On the outer edge of the circular surface is fitted a U-shaped, downwardly extending, ring groove 14 which features two spaced walls 15, 16 that run concentrically in relation to the axis of shaft 6, and also a bottom wall 17. The axial extension of the radial exterior wall 16 of groove 14 is less than the one of wall 15. On the upper edge of said wall 16 of groove 14 is connected, radially outwardly, a circular surface 18 which lies slightly below the circular surface that carries the friction disc 13. Walls 15 and 16, as well as bottom wall 17 of groove 14 and circular surface 18 are also coated with a radiation reflecting substance such as, for instance, brass.

The upper side of circular surface 18 is provided with a radiation seal 19 which concentrically surrounds groove 14 and which, for instance, could be provided in the form of a steel wire. Other types of seals could also be used here.

The free end of the upper beam 5 of frame 1 supports a swiveling sleeve 22 pivoted around two transverse pins 23 which are diametrically directed toward each other and project outwardly from the shell surface of sleeve 22. The pins engage into bores of beam 5 which run crosswise in relation to that upper beam 5 and to the axis of shaft 6.

The pivoting sleeve 22 is fitted, on its side that faces the vertical portion of frame 4, with a bracket 24 which is tilted in relation to the axis of shaft 6. Bracket 24 is connected, by means of a bolt 25, with the fork end 26 of the piston rod 27 of cylinder 28 in which piston 29 travels up and down.

Cylinder 28 features, at both of its ends, connections 30 and 31 for a pressurizing medium and, at its closed end, it is pivotally connected by means of bolt 32 with the vertical part 4 of the frame. A presser bar 35 slides up and down in sleeve 22 and is connected at its top with piston rod 36, which is directed into cylinder 37 where it is joined to the piston 38a therein. Cylinder 37 features two connections 38 and 39 for the pressurizing medium and it is joined by an intermediate member 40 to the top side of the sleeve 22.

At the lower end of the presser rod 35, the axis of which, when in working position, is aligned with the axis of shaft 6, a top plate 41 is rotatably mounted by a bearing which is not illustrated. The plate 41 is approximately a duplicate of bottom plate 12. It features a circular groove 42, opening downwardly, also a circular surface 43 which surrounds said groove 42, and which is equipped with a radiation seal 44, in the form of a steel wire, that projects downward. Other types of appropriate seals can be used here also, in place of wire. Groove 42 is fitted with a clamping device 45, in the form of a twin hose, to accommodate the bead 46 of the green tire blank 47. Those surfaces of top plate 41 which face the bottom plate 12 are coated with a substance that reflects radiation, for instance brass.

A supporting shaft 48 is concentrically connected with top plate 41 and, at its bottom, is fitted with a friction covering 49. This shaft is equipped with four intermediate discs 50, 51, 52 and 53 which are impervious to ultra-high frequency radiation. Obviously, the number of those intermediate discs can be varied according to existing requirements. The supporting shaft 48 is threaded, onto which are screwed the hubs 54, 55, 56 and 57 which carry those intermediate discs 50 to 53.

As will be apparent, especially from FIG. 2, two casing sections 61 and 62, which constitute an approximately cylindrical preheating chamber 60, are pivotally connected to 53a with the vertical frame portion 4, so that the sections caan swing, hinge-like, around an axis that runs parallel with the axis of shaft 6 and of preheating chamber 60. Casing section 61 comprises a curved shell 63 which extends 180° of the chamber circumference. The lower edge of said shell 63 is connected with a half-round bottom end wall 64, while a corresponding upper end wall 65 is connected with the upper edge of said shell 63. Running parallel with those end walls 64 and 65 are to be found intermediate walls 66, 67, 68 and 69. The number of the intermediate walls and, therefore, of the spaces built into the preheating chamber 60 can always be adjusted to suit existing conditions. The shell 63, the end walls 64, 65 as well as the intermediate walls 66, 67, 68, 69, are made of a material that is impervious to ultra-high frequency energy, as, for instance, brass, and extend radially inwardly from shell 63 varying distances.

Casing section 62 has a shell 70 formed by two curved segments between which is flat wall segment 71 through which are conducted several ultra-high frequency energy emitters 72, 73, 74, 75 and 76, which are connected with a common source of energy or with separate sources. Shell 70, of the casing section 62, is also connected with a semi-round bottom end wall 84 and with the corresponding upper end wall 85. Besides shell 70, similar to shell 63, is fitted with intermediate walls 86, 87, 88 and 89, whereby end walls 64, 65, as well as intermediate walls 66, 67, 68 and 69 of casing portion 61, always lie in one plane with one end wall 84, 85, or with one intermediate wall 86, 87, 88, 89, of the casing portion 62, respectively.

When casing portions 61-62 are closed, they constitute the preheating chamber 60, whereby the end and the intermediate walls of both casing portions come close to each other in the dividing plane and create the zones of chamber 60.

Energy emitters 72, 73, 74, 75, and 76 always discharge between an end and an intermediate wall or between two intermediate walls into the chamber 60. Each nozzle of the energy emitter is always wiped over by an impeller wheel 90, which is made of a radiation reflecting material, for example, brass, and which can rotate around an axis offset in relation to the nozzle.

On the outside of each shell 63 and 70, there is affixed a flange 91 which is pivotally connected with a piston rod 92 by a bolt 93. Each piston rod 92 leads into a cylinder 94 where it is joined to a sliding piston 95. The closed end of each cylinder 94 is pivoted, by bolt 96, to a cross bar 97 (not shown in FIG. 1) which in turn is solidly attached to the vertical frame member 4.

The procedure of the invention will now be described as it is performed in the operation of the apparatus of the type shown in FIGS. 1 and 2.

In the loading position of this apparatus, both casing sections 61 and 62, which constitute the preheating chamber 60, are swung open by the retraction of the piston rods 92 in cylinders 94. Also, the presser rod 35, with the upper plate 41 and the supporting shaft 48, is swung away from the vertical frame member 4, around the pivot bolts 23 by the retraction of piston rod 27 in cylinder 28. In addition, piston 38a has assumed its upper extreme position and has carried upward the upper plate 41 and the shaft 48.

In this starting position, it is possible to slide a blank 47 of a bias carcass green tire in the shape of a hollow cylinder, and therefore, not yet in a rounded form over the supporting shaft 48 and the intermediate discs 50, 51, 52 and 53 in such a way that the tire blank bead 46 engages into the clamping device 45 of top plate 41 and is solidly fastened therein.

Piston 29, by its rod 27, is then extended in cylinder 28 so that the supporting shaft 48 returns to its position in line with shaft 6. Thereupon, cylinder 37 is so activated by the pressurizing medium that its piston 38a descends and the lower bead 46a of the tire blank 47 enters into groove 14 of the lower plate 12. Simultaneously, the friction surface 49, at the lower end of supporting shaft 48, engages the friction disc 13 of the lower plate 12, so that when the lower plate 12 rotates in unison with friction disc 13 and friction surface 49, the supporting shaft 48 and the connected upper plate 41 will also rotate. Thereafter, both portions of the casing 61 and 62 are closed by extending the piston rods 92 in the cylinders 94, thereby constituting the preheating chamber 60, and the preheating process can begin.

When the chamber 60 is closed, the lower end walls 64, 84 lie closely above the circular surface 18 and essentially in the plane of the upper side of the middle portion of plate 12, and, together with the radiation seal 19, they form a hermetic closure of the chamber 60 at its bottom. Similarly, end walls 65 and 85 lie, when the chamber is closed, immediately below the circular surface 43 of upper plate 41, also essentially in the same plane as the under side of the middle range of that plate, and, together with the radiation seal 44, they create a hermetic closure of the preheating chamber 60 at its top. Beads 46 and 46a of tire blank 47, when chamber 60 is closed, lie outside of the latter and are protected from radiation energy by the chamber's end walls 64, 84, 65, 85.

Electric motor 8 actuates V-belt 10 and drives shaft 6, the supporting shaft 48, the upper plate 41 and the tire blank 47. The energy suppliers 72, 73, 74, 75 and 76 feed the ultra-high frequency energy into the various zones of chamber 60 whereby the energy emanating from each emitter is spread and distributed by a revolving impeller 90. The energy reaches the tire blank 47 directly or after reflecting on to end or intermediate walls.

When the energy extends through the blank 47, it is kept in the respective zone of the preheating chamber 60 by means of the intermediate discs 50, 51, 52 and 53, which are carried on the shaft 48 and are aligned with the intermediate walls 66, 67, 68 and 69 and 86, 87, 88 and 89.

The energy is fed through suppliers 72, 73, 74, 75 and 76 in varying amounts so that it is possible to modify the preheating of the individual sections of the tire blank 47 which are present in the different zones of the chamber. Those zones requiring a small amount of heat receive less than the zones requiring more, whereby the preheating of the zones is controlled in such a way that, predicated on the preheating temperature, all parts of the tire blank shall have received in the vulcanizing press, upon completion of the curing period, the same degree of cure.

As soon as the blank 47 has received the desired preheating, the admission of the energy is interrupted and motor 8 is turned off. Thereupon, by separating the casing sections 61, 62, the chamber 60 is opened, so that with the aid of the upper plate 41 the preheated blank 47 can be raised and swung free of the chamber. The blank is then removed and in its preheated condition it is given its rounded shape, in the ordinary manner, and subsequently it is vulcanized.

Figure 3:
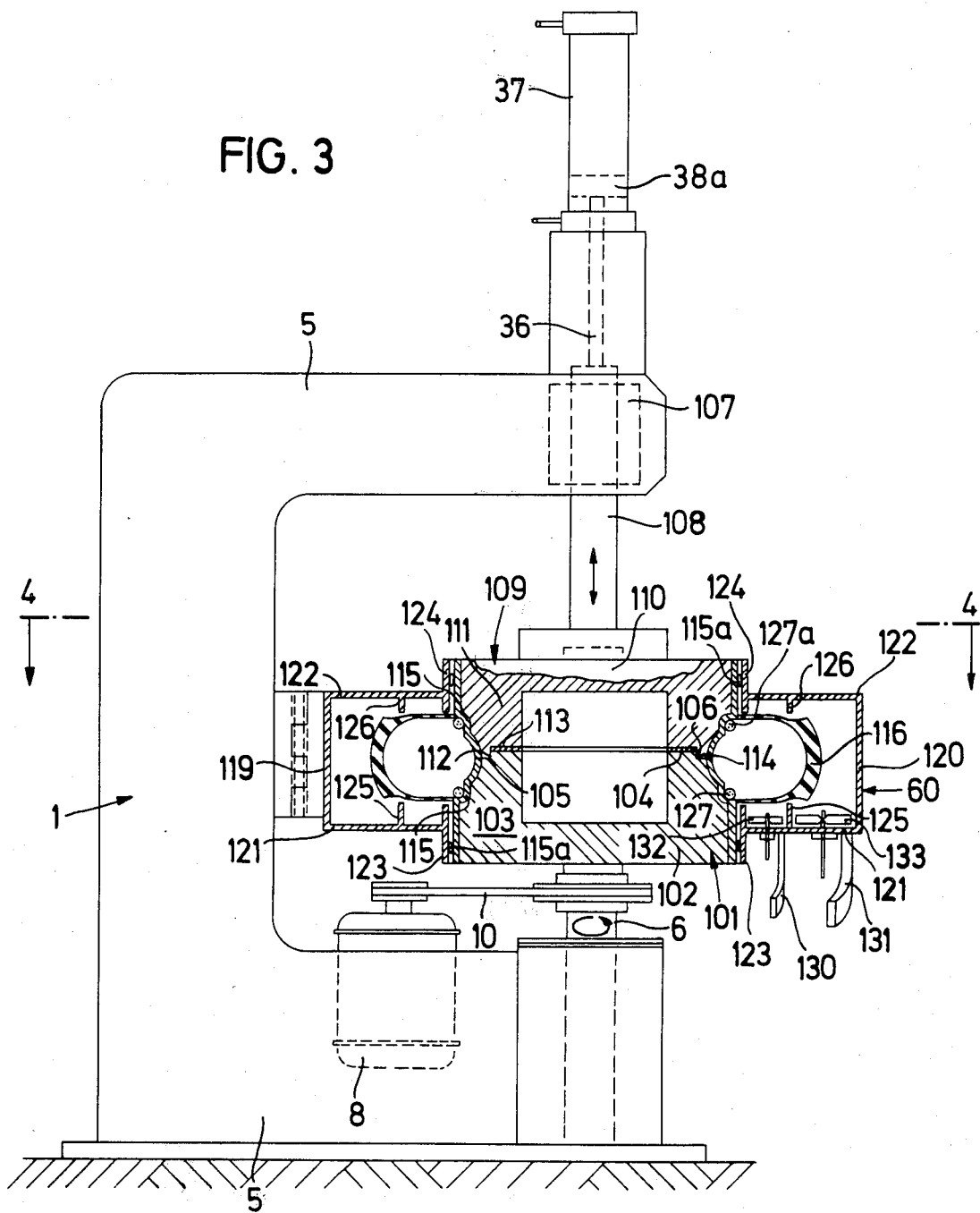
FIG. 3 is a sectional view along line 3—3 of FIG. 4 illustrating another form of execution of the new apparatus to preheat almost completely shaped green tire blanks.

Referring now to FIGS. 3 and 4, the procedure and apparatus of the invention will now be described in the embodiment designed for preheating green tire blanks which have been given the toroidal shape.

This form of the apparatus is to a great extent similar to the one previously described in that it also incorporates a C-shaped frame 1 which, in the free end of its bottom beam 5, has a vertical shaft 6 that, by means of a V-belt 10, is driven by an electric motor 8. Shaft 6 is fitted, at its upper end, with a carrying disc 101 which is shaped like a pot and made up of a base 102 and a circular rim 103. The free upper surface of that circular rim 103 features an inner circular face 104 with a friction coating and an outer circular surface 105 which is a lesser distance away from the base 102. Both circular surfaces 104 and 105 are separated from each other by a shoulder 106 which runs concentrically with the axis of shaft 6.

In the free end of the top arm 5 of frame 1 is a guiding bushing 107 wherein a presser rod 108 is housed that is connected with a piston rod 36 which is part of piston 38a of cylinder 37, as already described for the apparatus shown in FIGS. 1 and 2. At the bottom end of presser rod 108, which travels up and down, is fastened a presser disc 109 which also is shaped like a pot and which is formed by a base disc 110 and a circular rim 111. At the lower end of this latter are to be found two circular surfaces 113 and 114 which are separated from each other by a shoulder 112 whereby the outer circular surface 114 surrounds concentrically the inner circular surface 113 and is further removed from the base disc 110 than is surface 113. The inside circular surface 113 is fitted with a friction covering. The radial distance of shoulder 112 from the axis of the pressure disc 109 is slightly greater than the radial distance of shoulder 106 from the axis of the disc 101.

Carrying disc 101 and pressuring disc 109 have the same outer diameter and feature in each case, on their circumferential surfaces and spaced from the circular surfaces 105 and 114, respectively, cupped shoulders 115 to accommodate the beads of a green tire blank 116 which already has the toroidal profile.

Similar to the apparatus illustrated in FIGS. 1 and 2, the apparatus illustrated in FIGS. 3 and 4 provides for a hinged pre-heating chamber 60 consisting of two similar portions 117 and 118 each having a semicylindrical cross section and each featuring a curved shell 119 and 120 extending through an arc of 180°. Both these casing portions 117 and 118 are hinged to the vertical member 4 of the frame. Also, in conformity with the design previously described, they are connected by piston rods 92 with cylinders 94 which are held to and swing from crossbar 97 that is joined to the vertical frame member 4.

On the bottom edge of both shells 119 and 120 there is a semi-circular bottom end wall 121 which is radially directed toward the interior. Similarly, also on the upper edge of shells 119 and 120 there is to be found a corresponding upper end wall 122. The bottom end walls 121, which run transversely to the axis of chamber 60, are equipped at the radially internal edge with a circular wall 123 which runs concentrically with shells 119 and 120 respectively and which projects beyond the end walls both above and below the latter. In a similar manner, also the upper end walls 122 are each connected at their inner edge with a circular wall 124, which projects beyond those frontal walls 122 both above and below the latter and runs concentrically with shells 119 and 120. An intermediate wall 125 is also provided for on the upper portion of each end wall 121, concentric with shells 119 and 120. This intermediate wall terminates in spaced relationship above the end walls 121. Aligned with the intermediate wall 125 is an intermediate wall 126 on the underside of the end walls 122. In place of intermediate walls 125 and 126, which establish the zones that concentrically surround the longitudinal axis of the preheating chamber 60, one may insert many more intermediate walls in order to increase the number of zones.

On the cylindrical circumferential surfaces of the carrying disc 101 as well as of the pressuring disc 109 are fitted circular radiation seals 115a in the form of steel wires. One may also use different kinds of seals here.

Two suppliers 130 and 131 of ultra-high frequency energy are introduced parallel with the axis of the chamber 60, through the bottom end wall 121 of chamber sector 118 so that the energy supplier 130 empties into chamber 60 at an inner point that lies, radially inwardly of intermediate wall 125, while supplier 131 enters the chamber 60 at a point between that intermediate wall and shells 119 and 120, respectively. The nozzle opening of supplier 130 is wiped over by an impeller 132 which is made of a radiation reflecting metal, for instance brass, and which rotates about an axis that is displaced sideways in relation to the nozzle opening. The nozzle opening of supplier 131 is also wiped over by an impeller 133 which also turns around an axis that is displaced sideways in relation to the nozzle opening.

The apparatus illustrated in FIGS. 3 and 4 functions in the following manner: At the start, the pressuring disc 109 is in its uppermost position and both the casing sections 117 and 118 of the preheating chamber 60 are open. In this position of a bias carcass type tire which has been previously given the toroidal shape or a radial or a belted tire which have been built in a toroidal shape is laid inside, with the bottom bead 127 resting on the accommodating shoulder 115 of the supporting disc 101. Thereafter, by the action of cylinder 37, the piston rod 36 of the same moves downward, so that pressuring disc 109, with its friction coated circular surface 113, engages into the friction coat of the circular surface 104 of the supporting disc 101. Thus, the upper bead 127a of the green tire blank 116 comes to rest on the accommodating shoulder 115 of pressuring disc 109.

Now both sections 117 and 118 of the casing of chamber 60 are closed by the action of cylinders 94, so that their circular walls 123 and 124 make contact with seals 115a of carrying disc 101 and of pressuring disc 109. Shaft 6 is then driven by motor 8 by means of V-belt 10, so that the supporting disc is turned. Because of the friction connection between the circular surfaces 104 and 113, the pressuring disc 109 is also turned, so that the tire blank is also rotated. Through energy emitters 130 and 131, the ultra-high frequency energy is admitted into the zones of chamber 60 which have already been formed on both sides of intermediate walls 125 and 126, that energy being dispersed by the impellers 132 and 133 made of radiation reflection material.

Shells 119 and 120, end walls 121 and 122, intermediate walls 125 and 126 and circular walls 123 and 124 are made of a radiation reflecting material such as brass or at least coated with it. Also those surfaces of the carrying disc 101 which face the chamber 60 and those of pressuring disc 109 are coated with that same material.

When chamber 60 is closed, the circular walls 123 and 124 as well as the intermediate walls 125 and 126 reach close to the outer surface of the green tire blank 116 that is to be preheated and they create the zones in which the varying degree of preheating of that blank 116 occurs.

In the zone-by-zone preheating of blank 116 one proceeds in the same manner as already described with reference to the apparatus illustrated in FIGS. 1 and 2.

After blank 116 has been preheated, chamber 60 is opened. Then the pressuring disc 109 is raised and the preheated tire blank 116 is removed and taken to the vulcanization press where it is cured.

I claim:

1. An apparatus for prevulcanization heating of an uncured elastomer-containing tire comprising a chamber with a longitudinal axis adapted to enclose the tire, means within the chamber dividing it into separate zones with each zone in communication with a different annular portion of the tire, means for supplying ultra-high frequency energy individually to said zones, means to rotate the tire within said chamber, said chamber having portions so disposed relative to the tire enclosed thereby to exclude the beads of the tire from the said zones.

2. An apparatus as defined in claim 1 characterized in that the means for dividing the chamber into zones comprise interior walls which are impervious to ultra-high frequency energy.

3. An apparatus as defined in claim 2 characterized in that the said interior walls run transversely of the longitudinal axis of the chamber.

4. An apparatus as defined in claim 3 characterized in that the said interior walls extend from the outer walls of the housing to locations adjacent the outer surface of the uncured tire within the housing.

5. An apparatus as defined in claim 2 characterized in that the said interior walls surround concentrically the axis of a tire in said chamber.

6. An apparatus as defined in claim 5 characterized in that the said interior walls extend from regions adjacent the sides of a tire supported in the chamber to the respective ends of the chamber.

7. An apparatus as defined in claim 1 characterized in that the said means to supply ultra-high frequency energy to said zones comprises a separate energy emitter in each zone and a means adjacent each emitter to distribute energy therefrom within the zone.

8. An apparatus as defined in claim 7 wherein the said distributing means comprises a rotatable metal impeller.

9. An apparatus as defined in claim 1 characterized in that said chamber is formed by a housing comprising two portions pivoted for swinging about an axis parallel with but radially spaced from the axis of the means to rotate the tire.

10. An apparatus as defined in claim 1 characterized in that the said means to rotate a tire within the chamber comprises a shaft supported for rotation coaxially with the longitudinal axis of the chamber and means for clamping the tire to be preheated for rotation with said shaft.

11. An apparatus as defined in claim 10 characterized in that said shaft has a portion extending into the interior of the tire to be preheated which shaft portion has at least one disc thereon impervious to ultra-high frequency energy with the periphery of the disc adjacent the inner surface of a tire supported in the housing and in substantial alignment with the means dividing the chamber into zones.

* * * * *